(12) United States Patent
Ise et al.

(10) Patent No.: US 8,042,746 B2
(45) Date of Patent: Oct. 25, 2011

(54) VEHICULAR AIR CONDITIONER

(75) Inventors: Shinsuke Ise, Tokyo (JP); Masatoshi Urakawa, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 813 days.

(21) Appl. No.: 11/660,092

(22) PCT Filed: Jun. 7, 2006

(86) PCT No.: PCT/JP2006/311380
§ 371 (c)(1),
(2), (4) Date: Feb. 13, 2007

(87) PCT Pub. No.: WO2006/132258
PCT Pub. Date: Dec. 14, 2006

(65) Prior Publication Data
US 2009/0008467 A1    Jan. 8, 2009

(30) Foreign Application Priority Data
Jun. 8, 2005  (JP) .................................. 2005-168200

(51) Int. Cl.
*B60H 1/00* (2006.01)
(52) U.S. Cl. .................. 237/2 A; 237/12.3 R; 237/8 A; 237/69; 62/148; 62/141; 62/244; 165/42; 165/69
(58) Field of Classification Search .................. 237/2 A, 237/12.3 R, 69, 8 A; 62/148, 141, 244; 165/42, 165/69
See application file for complete search history.

(56) References Cited

U.S. PATENT DOCUMENTS

| 4,145,734 A | * | 3/1979 | Bienvenu ......................... 714/27 |
| 4,357,988 A | * | 11/1982 | Hudson et al. ................. 165/202 |
| 4,588,875 A | * | 5/1986 | Kozak et al. .................. 219/485 |

(Continued)

FOREIGN PATENT DOCUMENTS

JP    61-118818 A    6/1986

(Continued)

OTHER PUBLICATIONS

Notification of Reasons for Refusal issued by the Japanese Patent Office on Aug. 6, 2010 in Japanese Patent Application No. 2007-507606, and translation thereof.

*Primary Examiner* — Steven B McAllister
*Assistant Examiner* — Avinash Savani
(74) *Attorney, Agent, or Firm* — Buchanan Ingersoll & Rooney PC

(57) ABSTRACT

When there arises a need to change an air conditioner capability, a vehicular air conditioner capable of easily meeting this need is achieved. Also, even if some of a plurality of air conditioner units break down, a vehicular air conditioner capable of properly air conditioning a vehicular space using other air conditioner units, is achieved.
This vehicular air conditioner includes a controller 20 for calculating a total heat supply amount, based on a target temperature and an actual room temperature; at least one heater 5 and/or at least one cooler 6; a controller 20 that sets generated heat amounts of the heater 5 and/or the cooler 6 of each of the air conditioner units 30, based on a calculated total heat supply amount and the number of used air conditioner units 30; and a drive controller that controls operations of the heater 5 and/or the cooler 6, based on the generated heat amounts that have been set.

13 Claims, 4 Drawing Sheets

U.S. PATENT DOCUMENTS

| | | | |
|---|---|---|---|
| 4,752,697 A * | 6/1988 | Lyons et al. | 290/2 |
| 4,907,416 A * | 3/1990 | Fujii | 62/180 |
| 5,008,803 A * | 4/1991 | Iida | 701/36 |
| 5,191,768 A * | 3/1993 | Fujii | 62/209 |
| 5,275,012 A * | 1/1994 | Dage et al. | 62/208 |
| 6,292,741 B1 * | 9/2001 | Bitzer et al. | 701/115 |
| 6,542,767 B1 * | 4/2003 | McNichols et al. | 600/407 |
| 6,701,727 B2 * | 3/2004 | Komatsu et al. | 62/148 |
| 6,925,826 B2 * | 8/2005 | Hille et al. | 62/244 |
| 2001/0045099 A1 * | 11/2001 | Ohga et al. | 62/186 |
| 2003/0024924 A1 * | 2/2003 | Fristedt | 219/497 |
| 2003/0217559 A1 | 11/2003 | Ieda et al. | |
| 2004/0176858 A1 * | 9/2004 | Kuwahara et al. | 700/9 |
| 2005/0132039 A1 * | 6/2005 | Hartung | 709/223 |

FOREIGN PATENT DOCUMENTS

| | | |
|---|---|---|
| JP | 03-070621 A | 3/1991 |
| JP | 05-000622 A | 1/1993 |
| JP | 06-087321 A | 3/1994 |
| JP | 11-094331 | 4/1999 |
| JP | 2000-127737 A | 5/2000 |
| JP | 2003-335127 A | 11/2003 |
| WO | WO2007/108066 A1 | 9/2007 |

* cited by examiner

VEHICULAR AIR CONDITIONER

TECHNICAL FIELD

The present invention relates to an air conditioner for adjusting an interior temperature, and specifically, to a vehicular air conditioner suitable for applications in an electric car or bus.

BACKGROUND ART

Conventionally, as an example of vehicular air conditioner, there is an air conditioner of a type in which plurality of air conditioner units are used to air-condition a plurality of zones, into which a vehicular space is divided (refer to Patent Document 1 for example).

Patent Document 1: Japanese Unexamined Patent Application Publication No. 6-87321 (FIG. 1).

DISCLOSURE OF INVENTION

Problems to be Solved by the Invention

However, in the conventional vehicular air conditioner as described above, when there has arisen a need to change the air conditioning capability because of a change of the district where the vehicle runs, it has been necessary that almost all air conditioner units provided in the air conditioner are replaced with ones different in the capability.

Also, in the case when one of the air conditioner units has failed, even if other air conditioner units have margins of capabilities, there has occurred a problem in that the air conditioning for the zone corresponding to the failing unit becomes unsatisfactory.

The present invention has been made to solve the above-described problems. A first object of the present invention is to easily achieve a vehicular air conditioner capable of being accommodated to a situation in which there arises a need to change the air conditioning capability. Furthermore, a second object of the present invention is, even if some of the plurality of air conditioner units fails, to achieve a vehicular air conditioner enabling proper air conditioning of the vehicular space using other air conditioner units.

Means for Solving the Problems

A vehicular air conditioner according to the present invention comprises a plurality of air conditioner units, each including heat supply amount setting means for setting a heat supply amount; at least one heat generator and/or at least a cooled heat generator; and drive control means for controlling operations of the heat generator and/or the cooled heat generator, based on the heat supply amount set by the heat supply amount setting means, wherein a predetermined heat amount is supplied to the interior of a vehicle by operating the plurality of air conditioner units in combination.

Advantages

The vehicular air conditioner according to the present invention is configured so that a predetermined heat amount is supplied into the interior of a vehicle by operating a plurality of air conditioner units in combination. Therefore, when there arises a need to change the air conditioning capability, the present vehicular air conditioning produces an effect of being easily capable of meeting this need only by increasing or decreasing the number of air conditioner units. Also, when some of the plurality of air conditioner units fail, the present vehicular air conditioner produces an effect of performing an proper air conditioning of a vehicular space by using other air conditioner units.

Figure 1:
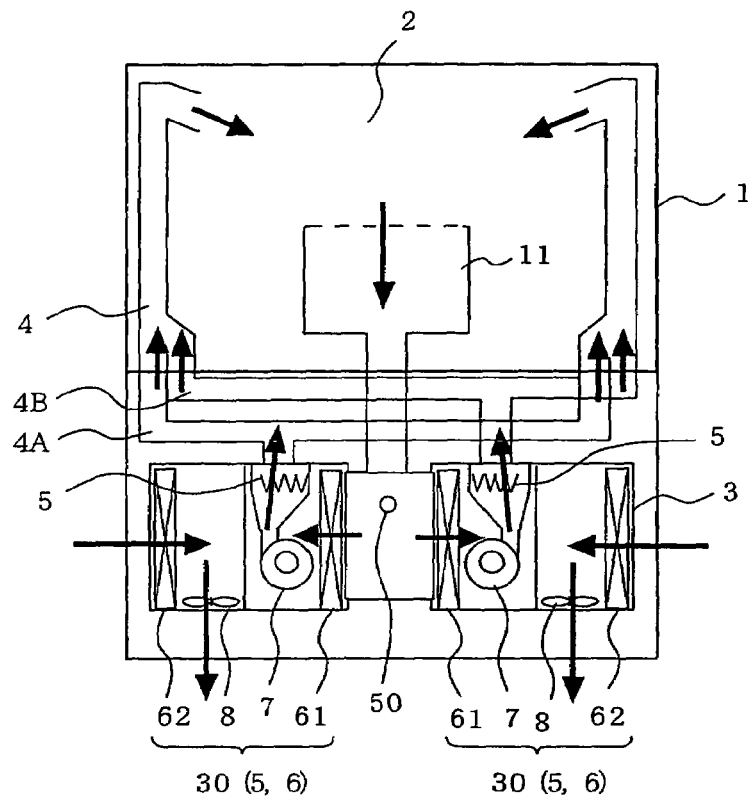
FIG. 1 is a schematic view of an application of a vehicular air conditioner according to a first embodiment of the present invention.

REFERENCE NUMERALS 1 vehicle
2 interior space
3 underfloor space
4 common duct
4A exclusive duct
4B exclusive duct
5 and 5A heaters
6 cooler
7 indoor fan
8 outdoor fan
9 relay
10 inverter
11 interior air intake port
20 controller
21 PI control portion
22 heater generated heat amount setting portion
23 heater duty factor control portion
24 cooler cooled heat amount setting portion
25 compressor frequency control portion
26 operation go/no-go information holding portion
30 and 30A air conditioner units
40 console panel
50 room temperature sensor
60 compressor
61 evaporator
62 condenser
63 expansion valve

BEST MODE FOR CARRYING OUT THE INVENTION

First Embodiment

Figure 2:
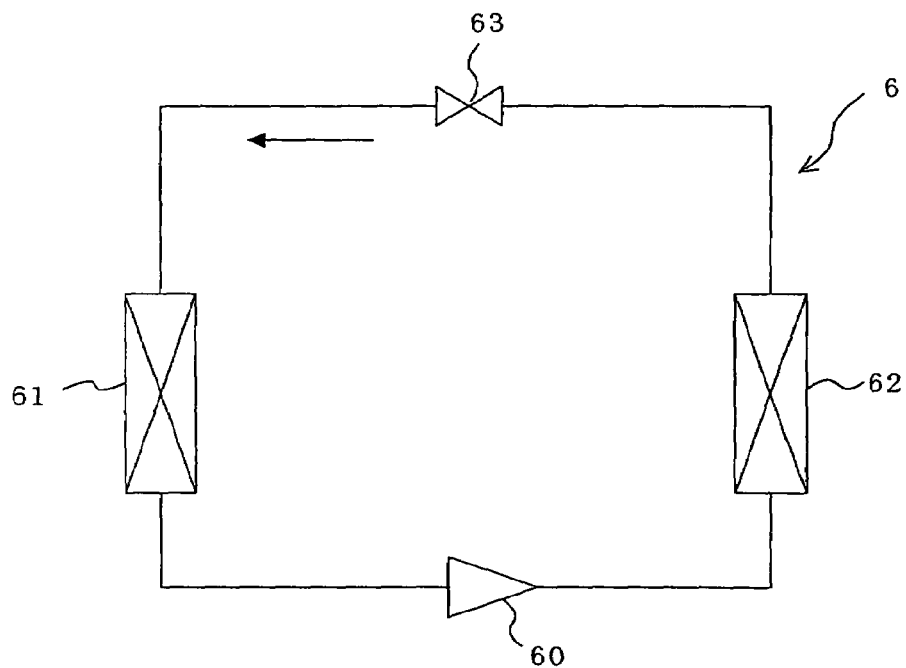
FIG. 2 is a schematic construction diagram of a refrigeration cycle constituting the vehicular air conditioner shown in FIG. 1.

FIG. 1 is a schematic view of an application of a vehicular air conditioner according to a first embodiment of the present invention. In FIG. 1, a vehicle 1 (irrespective of whether an electric car or a bus) into which this vehicular air conditioner is incorporated, is assumed to comprise an interior space 2 for a person(s) and/or cargo(s), and an underfloor space 3 to accommodate various devices. Two air conditioner units 30 constituting the vehicular air conditioner are installed in underfloor space 3. Each of the air conditioner units 30 includes a heater 5 serving as a heat generator, a cooler 6 serving as a cooled heat generator, an indoor fan 7, and an outdoor fan 8. The cooler 6 includes a refrigeration cycle constituted of a compressor 60, an evaporator 61, a condenser 62, and an expansion valve 63, as shown in FIG. 2. Also, a room temperature sensor 50 is provided in a portion where indoor air enters the evaporator 61.

In a narrow sense, the vehicular air conditioner according to the present invention indicates only a plurality of air conditioner units 30 used in combination, but in a broad sense, it includes also the room temperature sensor 50 and ducts 4, 4A, and 4B accompanying the air conditioner units 30, besides the air conditioner units 30.

In the above-described vehicle 1, air in the interior space 2 is taken in from an interior air intake port 11, and supplied to the two air conditioner units 30. Inside each of the air conditioner units 30, the air passes through the evaporator 61, and after having been driven by the indoor fan 7, it is fed from the air conditioner units 30 to the respective exclusive ducts 4A and 4B. Thereafter, the air having exited from the respective exclusive ducts 4A and 4B is mixed in the common duct 4, and supplied to the interior space 2. On the other hand, outside air driven by the indoor fan 7 passes through the condenser 62.

Figure 3:
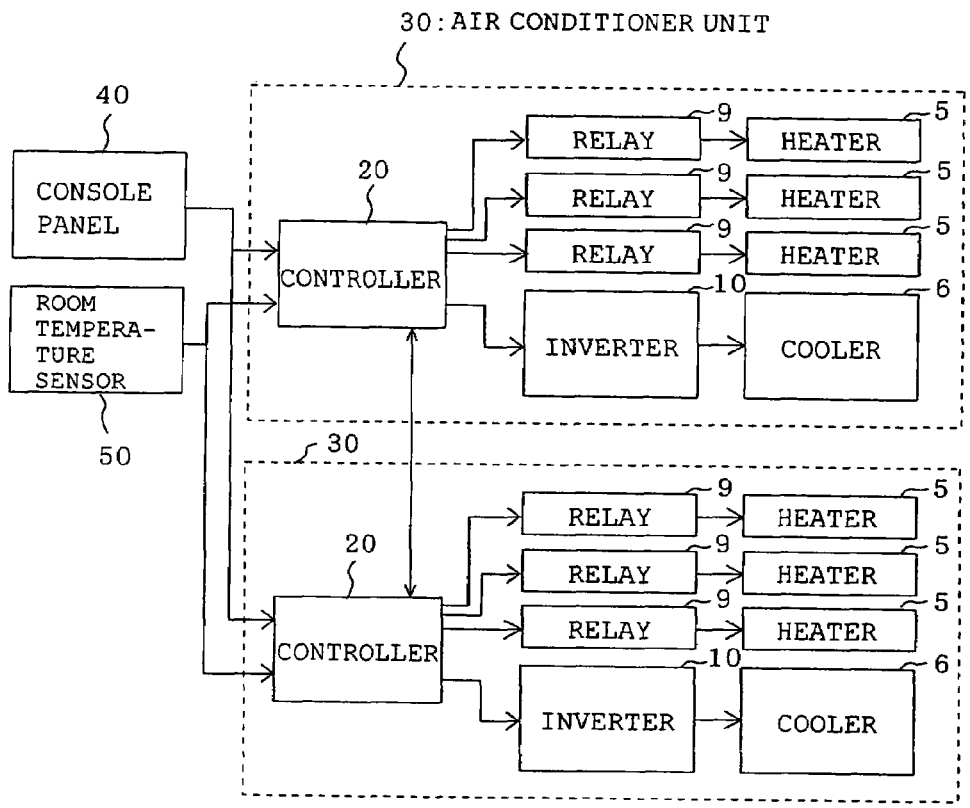
FIG. 3 is a block diagram showing the construction of the vehicular air conditioner according to the first embodiment of the present invention.

FIG. 3 is a block diagram showing the air conditioner units constituting the vehicular air conditioner and its peripheral devices according to the first embodiment of the present invention. This vehicular air conditioner comprises the two air conditioner units 30, a console panel 40 serving as target temperature setting means in air conditioning, and a room temperature sensor 50 serving as room temperature detecting means.

As descried above, the air conditioner unit 30 includes heaters 5 and a cooler 6. In the case of this air conditioner unit 30, there are provided three heaters 5 each having a generated heat amount of 2 kW, with the total generated heat amount being 6 kW. The three heaters 5 are subjected to control of their energization state by their respective three relays 9, and their operations (heat generation) are controlled. On the other hand, the cooler 6 consists of a single cooler alone, and the cooled heat amount of the cooler 6 is controlled by varying the operation frequency of the compressor 60 constituting the cooler 6. For this air conditioner unit 30, the control of operation frequency of compressor 60 is performed by using an inverter 10.

Furthermore, the air conditioner unit 30 has a controller 20 for controlling operations of the relays 9 and inverter 10.

Here, the relationship between the operation frequency of the compressor 60 and the cooled heat amount of the cooler 6 is shown in Table 1 for example. In Table 1, minus values indicate cooled heat amounts.

TABLE 1

| Frequency [Hz] | Cooling heat amount [kW] |
|---|---|
| 40 | −5 |
| 50 | −7 |
| 60 | −9 |

The flow of a control signal (or control information) in the vehicular air conditioner in FIG. 3 is as follows. Temperature information from the console panel 40 and room temperature sensor 50 is captured into the controller 20 of each of the air conditioner units 30. Based on the captured temperature information, an operation control signal with respect to each of the heaters or the cooler 6 are produced in the controller 20. Then, these operation control signals are sent to relays 9 and the inverter 10. Based on the operation control signals, the relays 9 control the energization of the heaters 5, and the inverter 10 controls the operation frequency of the compressor 60 for the cooler.

Figure 4:
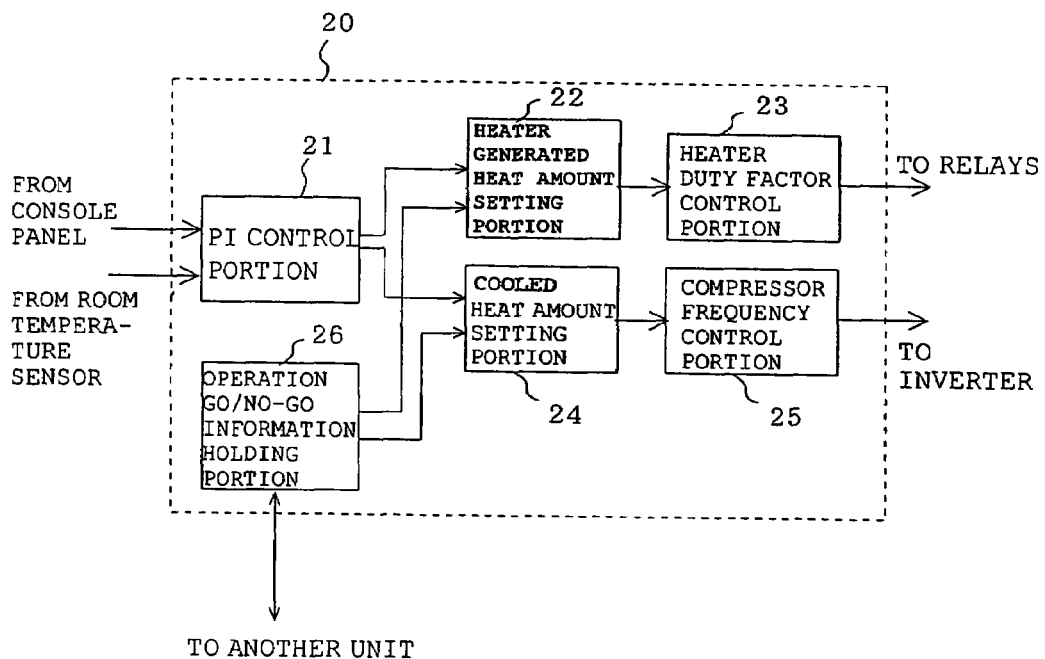
FIG. 4 is a block diagram showing the construction of the controller shown in FIG. 3.

FIG. 4 is a block diagram showing the construction of the controller 20 in FIG. 3. The controller 20 comprises a PI control portion 21 serving as a total heat supply amount calculation portion, a heater generated heat amount setting portion 22 serving as a generated heat amount setting portion, a cooled heat amount setting portion 24 serving as a generated cold heat amount setting portion, a heater duty factor control portion 23 constituting heater drive control means together with the relays 9, a compressor frequency control portion 25 constituting cooler drive control means together with the inverter 10, and an operation go/no-go information holding portion 26 concerning the heaters 5 and cooler 6.

Here, the PI control portion 21, heater generated heat amount setting portion 22, and cooled heat amount setting portion 24 are collectively referred to as heat supply amount setting means. Also, the heater generated heat amount setting portion 22 and cooled heat amount setting portion 24 are collectively referred to as a generated heat amount/cooled heat amount setting portion. Furthermore, the heater duty factor control portion 23 and compressor frequency control portion 25 are collectively referred to as drive control means.

This controller 20 comprises a microcomputer in which functions of the above-described portions are programmed.

The PI control portion 21 is configured to perform a feedback calculation of a total heat supply amount (synonymous with a total generated heat amount) of the plurality of air conditioner units 30, using proportion-integration control. Specifically, the PI control portion 21 calculates a heat supply amount command value Q as a total heat supply amount, based on target temperature information from the console panel 40 and room temperature information from the room temperature sensor 50. Here, the heat supply amount command value Q can be calculated also by using proportion-integration-differentiation control. In that case, the total heat supply amount calculation portion constitutes a PID control portion.

Based on the heat supply amount command value Q from the PI control portion 21, the number of air conditioner units 30 capable of operating heaters and the number of operable heaters 5 obtained from the operation go/no-go information holding portion 26, the heater generated heat amount setting portion 22 sets a heat amount to be generated in the heaters 5 of the pertinent air conditioner units 30.

The heater duty factor control portion 23 performs control (duty factor control) with respect to the relays 9 energizing the heaters 5, based on the heat amount set by the heater generated heat amount setting portion 22.

Based on the heat supply amount command value Q from the PI control portion 21, the number of air conditioner units 30 capable of cooling operation and the number of operable coolers 6 obtained from the operation go/no-go information holding portion 26, the cooled heat amount setting portion 24 sets a heat amount to be generated in the coolers 6 of the pertinent air conditioner units 30.

The compressor frequency control portion 25 sets an operation frequency of the compressor 60 constituting the cooler 6, based on the heat amount set by the cooled heat amount setting portion 24, and transmits the set value to the inverter 10.

The operation go/no-go information holding portion 26 detects respective failures of the heaters 5 and coolers 6, and stores the respective numbers of operable heaters 5 and coolers 6. The information stored in the operation go/no-go information holding portion 26 is mutually communicated and shared between the air conditioner units.

Next, operations of the above-described vehicular air conditioner will be described. A target temperature of the interior space 2 is set by the console panel 40, and the current room temperature is detected by the room temperature sensor 50. These pieces of temperature information are captured by the controller 20 of each of the plurality of air conditioner units 30.

In the PI control portion 21 of the controller 20, the heat supply amount command value Q is calculated from the sum of the difference between a target temperature and room temperature, multiplied by a proportion gain, and a time integration of the difference, multiplied by an integration gain. This is proportion integration control for feeding back the room temperature whereby the room temperature is controlled to be a target temperature.

The operation go/no-go information holding portion 26 detects whether the heaters 5 and cooler 6 of the pertinent air conditioner unit 30 are operable, and exchanges information on the number of operable heaters 5 and cooler 6 with other air conditioner units 30. Here, if blowing by the indoor fan 7 is impossible, the heaters 5 and cooler 6 are both disapproved of operating.

The heat supply amount command value Q produced in the PI control portion 21 is sent to the heater generated heat amount setting portion 22 and cooled heat amount setting portion 24.

Based on the heat supply amount command value Q, the heater generated heat amount setting portion 22 and cooled heat amount setting portion 24 set heat amounts to be generated (synonymous with heat supply amounts) in the heaters 5 and cooler 6 of the pertinent air conditioner unit 30. These settings are performed in conformance to setting patterns stored in advance in the above-described setting portions. The setting patterns are collected as a heat amount setting correspondence table, based on cooled heat amounts of the cooler 6 and predetermined variables. An example of the heat amount setting correspondence table is shown in Table 2.

TABLE 2

| Heat supply amount command value Q [kW] | Setting value of heater generated heat amount per unit [kW] | Setting value of cooled heat amount per unit [kW] |
| --- | --- | --- |
| $Q \geq 0$ | $Q \div N$ | 0 |
| $0 > Q \geq -5 \times N$ | $(Q \div N) + 5$ | $-5$ |
| $-5 \times N > Q \geq -7 \times N$ | $(Q \div N) + 7$ | $-7$ |
| $-7 \times N > Q$ | 0 | $-9$ |

When the cooler 6 mounted in each of the air conditioner units 30 is in good order, variables N in Table 2 indicate the number of air conditioner units 30 that are provided. In this vehicular air conditioner, therefore, when the cooler 6 is in good order, N=2 is given. If the number of the mounted air conditioner units is changed, it suffices only to change a value to be given to the variable N. Thus, the change in the number of air conditioner units can be easily coped with, without the need for a change in the control algorithm or the like.

Figure 5:
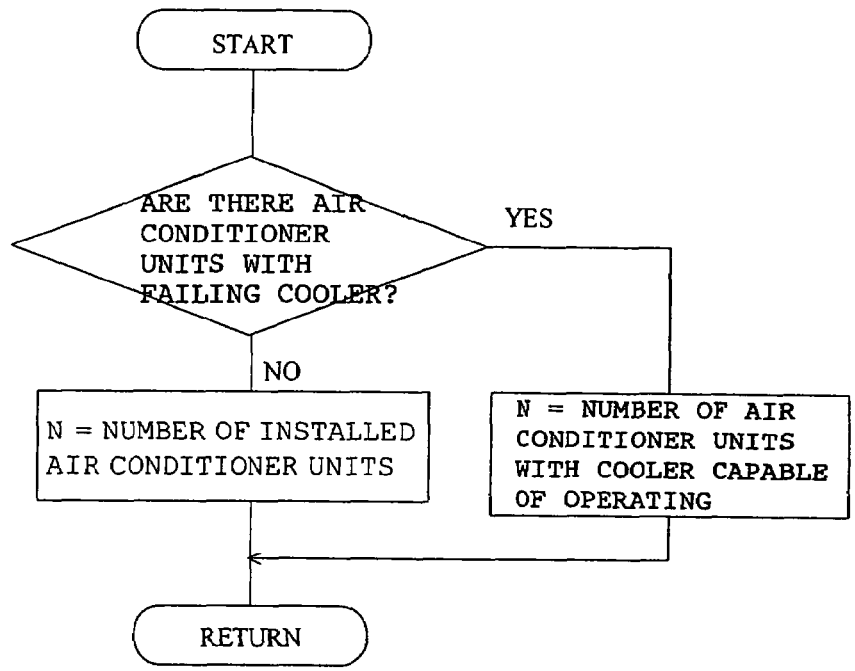
FIG. 5 is a flowchart showing a setting method for a variable N relating to the air conditioner unit in FIG. 1.

On the other hand, suppose the case where the cooler 6 is out of order. When there is an air conditioner unit 30 of which the cooler 6 is out of order, the number of air conditioner units 30 capable of operating the coolers 6 is procured from the operation go/no-go information holding portion 26, and this number is used as the variable N. FIG. 5 is a flowchart showing a setting method for such a variable N.

If there are air conditioner units having no cooler, the number of those air conditioner units is not included in the variable N.

In the heat amount correspondence table (Table 2), the generated heat amount of the cooler 6 is stepwise varied in accordance with the heat supply amount command value Q. The purpose of this is to avoid the occurrence of a breakage or failure due to a resonance of a piping system, by operating the compressor 60 constituting the cooler only at operation frequencies that ensure safety. The operation frequencies of the compressor 60 are not necessarily limited to the values shown in Table 1.

In this manner, since the setting of a heat amount is performed by using the heat amount correspondence table, even when attempting to change a characteristic of the cooler 6, it suffices only to correct the heat amount correspondence table. Thus, the change in characteristic of the cooler 6 can be easily coped with, without the need for a change in the control algorithm.

The generated heat amount of the heaters 5 is set so as to supply the heat amount in conformity with the heat supply amount command value Q by the entire vehicular air conditioner. The generated heat amount of heaters 5 is stepwise varied by switching on/off the heaters 5 by the relays 9, but macroscopically, the heat supply amount is controlled to continuously vary under duty factor control. specifically, the generated heat amount per hour is continuously varied by varying the ratio of the energization time to the energization cycle.

Figure 7:
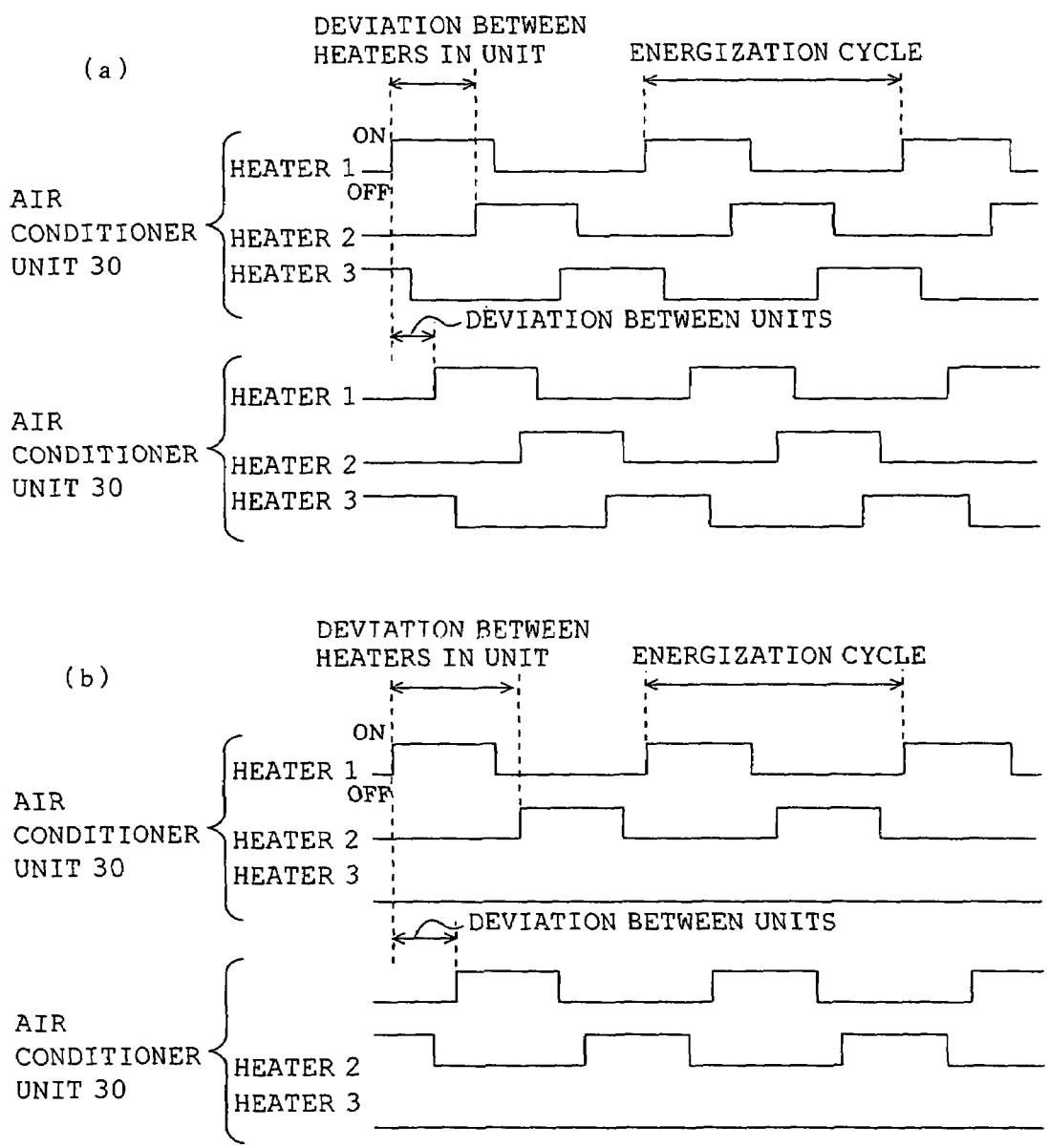
FIG. 7 is a timing chart of heater operations in the vehicular air conditioner according to the first embodiment.

Concurrently switching on/off a plurality of heaters 5 greatly changes power consumption in an instantaneous manner. The capacity of a power generator provided in vehicle devices has a limitation, and a great instantaneous change in power consumption has an adverse effect on the maintenance of a power source voltage. In the worst case, there are apprehensions of the occurrence of a stop of power generation system, or detrimental effects of fluctuations of the power source voltage on other vehicle devices. Accordingly, the timing of heater energization by the relays is varied by the number of air conditioner units 30 to be operated and the number of heaters 5 to be used, in addition to the setting of the generated heat amount of the heaters 5, under the condition in which a plurality of heaters 5 are not concurrently switched on/off. In this example, two air conditioner units 30 each use three of the heaters 5. Here, as shown in FIG. 7(*a*), the on-timings of three heaters 5 of each single air conditioner unit 30 is designed to deviate from each other by ⅓ cycle, and the heater on-timings of two-air conditioner units 30 are designed to deviate from each other by ⅙ cycle. Taken all together, therefore, six heaters in total have on-timings that deviate from each other by ⅙ cycle, thus preventing the six heaters from being concurrently switched on. Furthermore, it is preferable that the duty factors of all heaters be set so as to be equal to each other, to thereby prevent a plurality of heaters from being concurrently switched off.

Next, regarding a single air conditioner unit 30, suppose that one of its three heaters 5 fails and the umber of usable heaters becomes two. In this case, when attempting to equalize the generated heat amounts of two air conditioner units 30, the duty factor per heater is different between an air conditioner unit 30 that can use two heaters and another air conditioner unit 30 that can use three heaters. At this time, even if a setting is performed so that their on-timings do not overlap between the air conditioner units, their off-timings may overlap. To avoid this, as shown in FIG. 7(b), even in the air conditioner unit having three usable heaters, only two heaters are used. Here, the on-timings of the two heaters of each air conditioner unit are designed to deviate from each other by ½ cycle, and the on-timings of two air conditioner units are designed to deviate from each other by ¼ cycle. Furthermore, it is preferable that duty factors of all heaters be set so as to be equal to each other, thereby to prevent on-timings and off-timings from overlapping among the heaters.

Based on a conception similar to the foregoing, when the number of used air conditioner units changes, or when the number of heaters in the air conditioner unit changes, the timing deviation amount between heaters is determined as follows.

When Nu units of air conditioner units each use ne pieces of heaters, the phase of the n-th heater of the N-th air conditioner unit is assumed to be given by the following expression.

$$((N-1) \div (Nu \times ne) + (n-1) \div ne) \times Ts$$

Here, Ts denotes an energization cycle.

Thereby, the timings of the heaters deviate from each other by $[1 \div (Nu \times ne)]$ cycles. This allows a plurality of heaters to be prevented from being concurrently switched on/off.

As described above, in order to air-condition the vehicular space, the vehicular air conditioner operates a plurality of air conditioner units 30 in combination, each air conditioner unit 30 including the PI control portion 21, heater generated heat amount setting portion 22, cooled heat amount setting portion 24, and operation go/no-go information holding portion (these are referred to as the heat supply amount setting means); heater duty factor control portion 23 and relays 9 (these are referred to as the heat generation control means); compressor frequency control portion 25 and inverter 10 (these are referred to as the cold heat generation control means); operation go/no-go information holding portion 26; heaters 5; and cooler 6. The present vehicular air conditioner has the following effects.

When a need to change the air conditioning capability arises, this need can be easily met by increasing or decreasing the number of air conditioner units.

The generated heat amounts of the heaters 5 and cooler 6 of each of the air conditioner unit are designed to be set based on the number of air conditioner units, and therefore, even if the number of air conditioner units provided is changed, it is possible to easily cope with this change.

Since the generated heat amounts of the heaters 5 and cooler 6 are designed to be set based on the operation go/no-go information on the heaters 5 and cooler 6, stable control is achievable even if a failure occurs.

The patterns of heat amounts to be generated by the heater 5 and cooler 6 are tabled and held. Control is performed based on these patterns, and therefore, when attempting to change the characteristic of the cooler 6, it suffices only to correct the table. Thus, the change in the cooler characteristic can be easily coped with, without the need for a change in the control algorithm.

Since the total heat supply amount is determined by a feedback calculation by the target temperature information set by the console panel 40 and the room temperature information detected by the room temperature sensor 50, a user can obtain a target temperature adjustment only by setting a target temperature, without being conscious of the heat supply amount of the air conditioner. Specifically, it is possible to perform a temperature adjustment with an error on the level of ±1° C. by using the PI control or PID control.

Since the heat supply amount is varied by stepwise varying the operation frequency of the compressor 60 only at frequencies that ensures safety, it is possible to avoid the occurrence of a breakage or failure due to a resonance of a piping system. Here, the variation in the operation frequency can be easily achieved by using the inverter 10.

Since the heater 5 is subjected to duty factor control, it is possible to utilize a simple device such as a relay 9 as an energization control device for the heater 5, and also to obtain macroscopically continuous change in the generated heat amount, thereby allowing a target heat supply amount to be quickly generated from the air conditioner unit 30.

Since the deviation amounts of the energization timing of heaters 5 between air conditioner units 30 are determined by the number of air conditioner units 30 and the number of heaters 5 of each of the air conditioner units 30, it is possible to prevent a plurality of heaters 5 from concurrently starting energization, thereby allowing the avoidance of a detrimental effect on the power source device.

Since the numbers of operable heaters in each of the air conditioner units 30 are compared with one another, and to the number of operable heaters in an air conditioner unit 30 having fewest operable heaters out of all of the air conditioner units, the number of operable heaters of the other air conditioner units is conformed, it is possible to prevent a plurality of heaters 5 from concurrently starting energization even if some of the heaters 5 fail, thereby allowing the avoidance of a detrimental effect on the power source device.

When Nu units of air conditioner units each use ne pieces of heaters, the phase of the n-th heater of the N-th air conditioner unit is assumed to be given by the following expression.

$$((N-1) \div (Nu \times ne) + (n-1) \div ne) \times Ts,$$

where Ts denotes an energization cycle.

Thereby, a plurality of heaters 5 are prevented from concurrently starting energization. This allows the avoidance of a detrimental effect on the power source device.

The duty factors of all heaters used is designed to be equal to each other, so that, when a plurality of heaters 5 are prevented from concurrently starting energization, it is also prevented that the plurality of heaters 5 concurrently finish energization, as well. This allows the avoidance of a detrimental effect on the power source device.

In the first embodiment, the room temperature sensor 50 is disposed outside the air conditioner unit 30. However, the arrangement may be such that the room temperature sensor 50 is disposed inside some air conditioner unit 30, e.g., in an air intake portion of the evaporator 61, and that a plurality of air conditioner units 30 use the identical value of room temperature through mutual communications between the plurality of air conditioner units 30.

Second Embodiment

In the first embodiment, heat amounts generated in a plurality of air conditioner units are all arranged to be equal to each other, but in a second embodiment, examples in which generated the heat amounts generated in all of the plurality of air conditioner units are not necessarily equal to each other, are shown. Here, the disposition relationship between a vehicle and air conditioner units is the same as that shown in FIG. 1, and the construction of a cooler is the same as that shown in FIG. 2.

Figure 6:
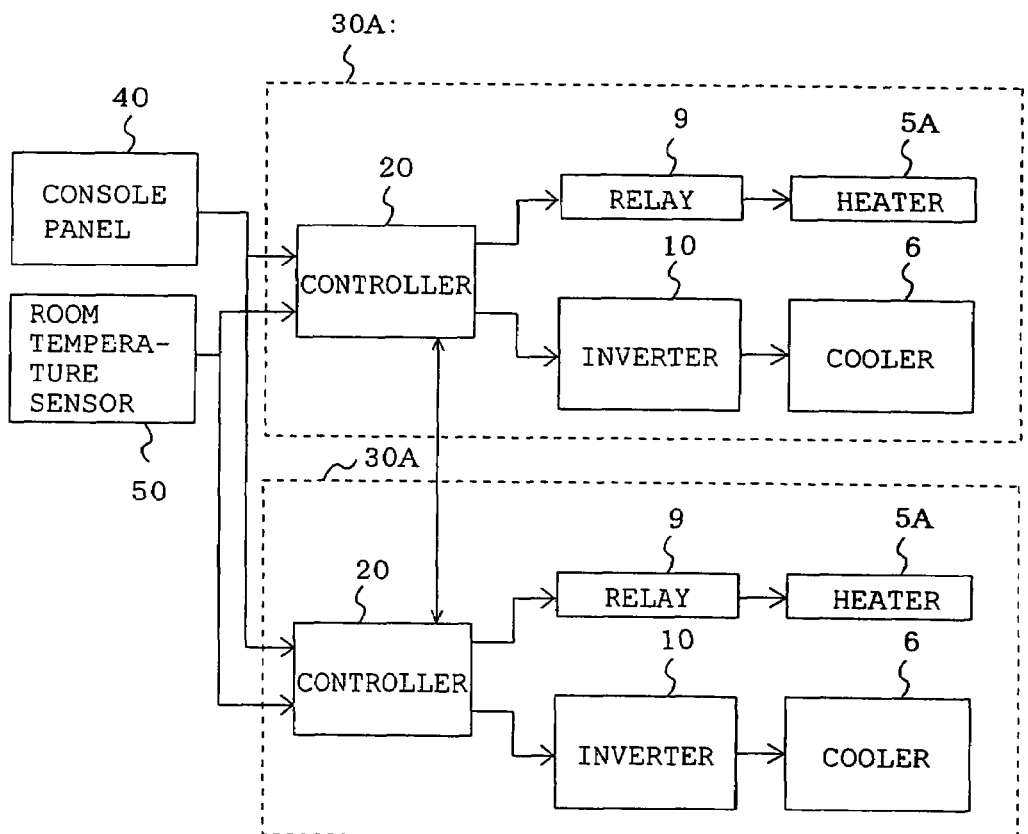
FIG. 6 is a block diagram showing the construction of a vehicular air conditioner according to a second embodiment of the present invention.

FIG. 6 is a block diagram showing a vehicular air conditioner and flows of control signals according to the second embodiment of the present invention. This vehicular air conditioner includes two air conditioner units 30A each having an imparted order, console panel 40, and room temperature sensor 50. Each of the air conditioner unit 30A has one heater 5 and one relay for controlling the heater. The generated heat amount of the heater 5 is assumed to be 2.5 kW. Also, there is provided one cooler 6, and its generated heat amount is controlled under operation frequency control of compressor 60 by the inverter 10. Here, the relationship between the frequency of the cooler 60 and the generated heat amount of the cooler 6 is assumed to be the same as that shown in Table 1 in the first embodiment. There is also provided the same controller 20 as that shown in the first embodiment.

Based on the heat supply amount command value Q set by the PI control portion 21, the heater generated heat amount setting portion 22 and cooled heat amount setting portion 24 set heat amounts to be generated in the heater 5A and cooler 6 of the pertinent air conditioner unit 30. Here, these settings are performed based on the heat supply amount command value Q, the number of air conditioner units, and the imparted order of a pertinent air conditioner unit in all of the air conditioner units. Therefore, between an air conditioner unit 30A having a first order (this is assumed as the air conditioner unit (1)) and an air conditioner unit 30A having a second order (this is assumed as the air conditioner unit (2)), the heat amount setting methods are partly different. This difference is based on the difference in setting pattern therebetween. The heat amount setting correspondence tables showing the setting patterns of the air conditioner units (1) and (2) are shown in Table and Table 4, respectively. Here, the variables N in Tables 3 and 4 are determined in the same way as in Table 2.

TABLE 3

| Heat supply amount command value Q [kW] | Setting value of heater calorific value of unit (1) [kW] | Setting value of cooling heat amount of unit (1) [kW] |
| --- | --- | --- |
| $Q \geq 0$ | $Q \div N$ | 0 |
| $0 > Q \geq -5$ | $(Q \div N) + (5 \div N)$ | $-5$ |
| $-5 > Q \geq -5 \times N$ | $(Q \div N) + 5$ | $-5$ |
| $-5 \times N > Q \geq -7 \times N$ | $(Q \div N) + 7$ | $-7$ |
| $-7 \times N > Q$ | 0 | $-9$ |

TABLE 4

| Heat supply amount command value Q [kW] | Setting value of heater calorific value of unit (2) [kW] | Setting value of cooling heat amount of unit (2) [kW] |
| --- | --- | --- |
| $Q \geq 0$ | $Q \div N$ | 0 |
| $0 > Q \geq -5$ | $(Q \div N) + (5 \div N)$ | 0 |
| $-5 > Q \geq -5 \times N$ | $(Q \div N) + 5$ | $-5$ |
| $-5 \times N > Q \geq -7 \times N$ | $(Q \div N) + 7$ | $-7$ |
| $-7 \times N > Q$ | 0 | $-9$ |

In Tables 3 and 4, the heat supply amount command values Q are classified into five cases. As can be seen from Tables 3 and 4, when the heat supply amount command value Q is not less than −5 kW and less than 0, it is only the air conditioner unit (1) that operates the cooler. At this time, the generated heat amount of the cooler 6 is −5 kW. When the heat supply amount command values Q is a minute cooled heat amount that is close to 0, the generated heat amount of the heater needs nearly 5 kW. Here, since the heater capacity of a single air conditioner unit is 2.5 kW, the two heaters 5A of the two air conditioner units are to be used. That is, when the heat supply amount command value Q is not less than −5 kW and less than 0, the air conditioner unit (1) operates both the cooler 6 and heater 5A, while the air conditioner unit (2) operates the heater 5A alone. This provides a minute cooled heat amount. In the cases of the remaining four heat supply amount command values Q, the air conditioner units (1) and (2) exhibits the identical generated heat value.

When the heat supply amount command value Q is not less than −5 kW and less than 0, the temperatures of air discharged from the two air conditioner units (1) and (2) to exclusive ducts 4A and 4B, respectively, are different from each other. However, because these ducts merge with a common duct 4 on their way from the air conditioner units to the interior, the air from the two air conditioner units is mixed, so that there is no possibility of causing discomfort due to blowing winds with mutually different temperatures.

As stated above, since the vehicular air conditioner according to the second embodiment uses the air conditioner unit performing a heat generating operation and the air conditioner unit performing a cooled heat generating operation in combination, it is possible to obtain a target heat amount, though a single unit would not allow a minute cooled heat amount to be supplied.

Also, since the discharged air from a plurality of air conditioner units is supplied after having been mixed, it is possible to avoid causing discomfort due to blowing winds with mutually different temperatures.

Furthermore, the generated heat amounts of heat generators and cooled heat generator of each of the air conditioner units are set based on imparted order of the pertinent air conditioner unit in all air conditioner units, in addition to the number of the air conditioner units. Therefore, even when operations vary between the air conditioner units, it is possible to set generated heat amounts by the Tables.

In the above-described first and second embodiments, the air conditioner units constituting the vehicular air conditioner has been described by examples in which there are provided two air conditioner units with the same construction, but the air conditioner units may include three or more units. Also, each of the numbers of heat generators (such as heaters) and cooled heat generators (such as coolers) of the air conditioner units is not necessarily the same between the air conditioner units, but may be mutually different therebetween. Furthermore, some of the plurality of air conditioner units may include only the heat generator (such as heater) or the cooled heat generator (such as cooler).

INDUSTRIAL APPLICABILITY

The vehicular air conditioner according to the present invention has special effects on applications to various vehicles such as ordinary trains, buses, and the like. This is because, in spite of that these vehicles are different in the required air conditioning capability depending on a district where the vehicles run, the present vehicular air conditioner has the advantage of being able to easily cope with the difference in air conditioning capability by changing the number of air conditioner units. Also, the vehicular air conditioner according to the present invention can also be applicable to air conditioning for spaces other than vehicles.

The invention claimed is:

1. A vehicular air conditioner comprising:
a plurality of air conditioner units, each comprising;
heat supply amount setting means for setting a heat supply amount;
a heat generator and a cooled heat generator; and
drive control means for controlling operations of the heat generator and the cooled heat generator, based on the heat supply amount set by the heat supply amount setting means,
wherein a heat amount is supplied to an interior of a vehicle by the plurality of air conditioner units being operated in combination,
the heat supply amount setting means comprises:
a total heat supply amount calculation portion for calculating a total heat supply amount command value of the plurality of air conditioner units, based on a target temperature and an actual room temperature; and
a generated heat amount/cooled heat amount setting portion for setting generated heat amounts of the heat generator and the cooled heat generator of each of the air conditioner units, based on the total heat supply amount command value and the number of the air conditioner units,
wherein each of the air conditioner units holds operation go/no-go information as to whether the heat generator and the cooled heat generator owned thereby is each permitted to operate, and has an operation go/no-go information holding portion that exchanges the operation go/no-go information with the other air conditioner units; and
the generated heat amount/cooled heat amount setting portion of each air conditioner unit sets generated heat amounts of the heat generator and the cooled heat generator based on a setting pattern set for each air conditioner unit, wherein when the heat supply amount command value is less than a predetermined cooled heat amount, the setting pattern is set so that the cooled heat generator of a certain air conditioner unit is operated in a predetermined lowest set value and cooled heat generators of the other air conditioner units are suspended, and, a generated heat amount of the heat generator of each air conditioner unit that is operable is set to be the same.

2. The vehicular air conditioner according to claim 1, wherein the generated heat amount/cooled heat amount setting portion further sets generated heat amounts of the heat generator and the cooled heat generator of each of the air conditioner units, making an allowance for an order predetermined in the plurality of air conditioner units.

3. The vehicular air conditioner according to claim 1, wherein the generated heat amount/cooled heat amount setting portion has generated heat amount patterns of the heat generator and the cooled heat generator, the patterns having been tabulated in advance; and
wherein generated heat amounts of the heat generator and/or the cooled heat generator are set based on the patterns.

4. The vehicular air conditioner according to claim 1, further comprising:
target temperature setting means for setting a target value of room temperature; and
room temperature detecting means for detecting a room temperature,
wherein the total heat supply amount calculation portion performs a feedback calculation based on target temperature information set by the target temperature setting means and room temperature information detected by the room temperature detecting means.

5. The vehicular air conditioner according to claim 1, wherein, the cooled heat generator is constituted of a refrigeration cycle including a compressor and has an inverter that varies the operation frequency of the compressor in a stepwise manner.

6. The vehicular air conditioner according to claim 1, wherein, the drive control means energizes the heat generator in repeated cycles, and continuously varies the generated heat amount of the heat generator in a macroscopic manner by varying the ratio of the energization time.

7. The vehicular air conditioner according to claim 6, wherein, based on the number of the air conditioner units and the number of the heat generators owned by each of the air conditioner units, deviation amounts of energization timings for the heat generators between the air conditioner units can be each set.

8. The vehicular air conditioner according to claim 7, wherein the number of heat generators operated by each of the air conditioner units is determined in conformance to the number of operable heat generators of the air conditioner unit having the fewest operable heat generators out of the air conditioner units, and
wherein the deviation amounts of energization timings for the heat generators between the air conditioner units are each determined based on the number of the air conditioner units and the number of the heat generators operated by each of the air conditioner units.

9. The vehicular air conditioner according to claim 8, wherein, when Nu units of air conditioner units each operate ne pieces of heat generators, the deviation amount of energization timing between the first heat generator of the first unit and the n-th heat generator of the N-th unit is represented by the following expression:

$$((N-1) \div (Nu \times ne) + (n-1) \div ne) \times Ts,$$

where Ts denotes an energization cycle.

10. The vehicular air conditioner according to claim 6, wherein duty factors of all heat generators used are set to be equal to each other.

11. The vehicular air conditioner according to claim 1, wherein a target heat amount is obtained by combining the air conditioner unit that performs a heat generating operation and the air conditioner unit that performs a cold heat generating operation.

12. The vehicular air conditioner according to claim 1, wherein discharged air from a plurality of the air conditioner units is mixed and supplied into the interior.

13. The vehicular air conditioner according to claim 1, wherein
the plurality of air conditioner units has a heat generator and a cooled heat generator capable of adjusting generated cooled heat amounts, and
the generated heat amount/cooled heat amount setting portion determines the number of units N of air conditioner units that the cooled heat generator can drive among the plurality of air conditioner units to set generated heat amounts of the heat generator of the air conditioner unit using the determined value N.

* * * * *